(12) United States Patent
Kusano

(10) Patent No.: US 8,937,120 B2
(45) Date of Patent: Jan. 20, 2015

(54) ADDITIVE FOR RECLAMATION OF ASPHALT, RECLAIMED ASPHALT PAVEMENT MATERIAL CONTAINING SAME, MODIFIED ASPHALT, AND ASPHALT PAVEMENT MATERIAL CONTAINING SAME

(71) Applicant: Yukio Kusano, Miyagi (JP)

(72) Inventor: Yukio Kusano, Miyagi (JP)

( * ) Notice: Subject to any disclaimer, the term of this patent is extended or adjusted under 35 U.S.C. 154(b) by 0 days.

(21) Appl. No.: 14/295,768

(22) Filed: Jun. 4, 2014

(65) Prior Publication Data

US 2014/0283710 A1    Sep. 25, 2014

Related U.S. Application Data

(62) Division of application No. 13/704,755, filed as application No. PCT/JP2011/060963 on May 12, 2011, now abandoned.

(30) Foreign Application Priority Data

Jun. 18, 2010   (JP) ................................. 2010-139114

(51) Int. Cl.
| | | |
|---|---|---|
| C08L 95/00 | (2006.01) | |
| C09D 7/12 | (2006.01) | |
| C08L 91/00 | (2006.01) | |
| C08L 91/06 | (2006.01) | |
| C08L 99/00 | (2006.01) | |
| C08L 101/00 | (2006.01) | |

(52) U.S. Cl.
CPC ............... *C09D 7/1233* (2013.01); *C08L 91/00* (2013.01); *C08L 91/06* (2013.01); *C08L 95/00* (2013.01); *C08L 99/00* (2013.01); *C09D 7/125* (2013.01); *C08L 101/00* (2013.01); *C08L 2555/22* (2013.01); *C08L 2555/34* (2013.01); *C08L 2555/64* (2013.01); *C08L 2555/74* (2013.01); *C08L 2555/80* (2013.01); *C08L 2555/32* (2013.01)
USPC .............. 524/59; 106/245; 106/278; 106/285

(58) Field of Classification Search
USPC .............................. 524/59; 106/245, 278, 285
See application file for complete search history.

(56) References Cited

U.S. PATENT DOCUMENTS

2008/0250751 A1   10/2008   Pavan et al.
2010/0034586 A1*   2/2010   Bailey et al. .................... 404/75

* cited by examiner

*Primary Examiner* — Peter Szekely
(74) *Attorney, Agent, or Firm* — Wenderoth, Lind & Ponack, L.L.P.

(57) ABSTRACT

An additive for reclaiming asphalt of the present invention, which is obtained by adding straight asphalt to a mixture of a waste animal or vegetable oil and a waste mineral oil having a kinematic viscosity at 60° C. of 10 $mm^2/s$ to 40 $mm^2/s$, mixing the materials, and heating the resultant mixture to remove an aromatic component. The additive for reclaiming asphalt can restore the physical properties of a deteriorated asphalt component to the same or greater extent than that of a conventional additive for reclaiming asphalt, and the additive has low content of components that may affect the environment or humans, and high fluidity at room temperature, and is available at an extremely low cost.

9 Claims, 4 Drawing Sheets

ADDITIVE FOR RECLAMATION OF ASPHALT, RECLAIMED ASPHALT PAVEMENT MATERIAL CONTAINING SAME, MODIFIED ASPHALT, AND ASPHALT PAVEMENT MATERIAL CONTAINING SAME

TECHNICAL FIELD

The present invention relates to an additive for reclaiming asphalt, a reclaimed asphalt pavement material that contains same, a modified asphalt, and an asphalt pavement material that contains same.

BACKGROUND ART

The total amount of production of asphalt mixtures is decreasing each year after reaching a peak in 1989 (see Non Patent Document 1). This is because the length of roads paved with asphalt in Japan has already reached 1,190,000 km and hence the number of roads to be newly constructed is reducing. Meanwhile, the reclamation rate of asphalt pavement waste, which was 7.6% in 1989, continues to increase abruptly, reaching 73.1% in 2008. This trend is expected to become stronger and stronger in the future as well.

Two methods each involving restoring the physical properties of an asphalt component that has deteriorated over time with an additive for reclaiming asphalt have been known for the reclamation of asphalt pavement waste (see Non Patent Document 2). One of the methods is a road-surface recycling method (remix system and repave system) but this is seldom adopted in Japan. The other is a plant recycling pavement method (plant mix system) which has gone mainstream in Japan. Several kinds of products (each using, for example, a semi-refined oil at the time of petroleum refining as a main raw material) have been commercially available as additives for reclaiming asphalt that can be used in the plant recycling pavement method. However, the products are not only expensive, but the products have high viscosities (are greasy) at room temperature and hence need to be heated to about 70° C. to 80° C. at all times. Accordingly, it is inconvenient to handle the products and heat source costs are required. In addition, concerns are raised about the effect of the products on the environment and humans because the products each contain large amounts of aromatic components.

In view of the foregoing, for example, an additive for reclaiming asphalt obtained by blending a mineral oil having a kinematic viscosity at 60° C. of 100 to 1,000 mm²/s, and a fat, the additive having a kinematic viscosity at 60° C. of 20 to 300 mm²/s and a flash point of 220° C. or more (see Patent Document 1), and an additive for reclaiming asphalt obtained by blending a mineral oil having a kinematic viscosity at 40° C. of 300 to 900 mm²/s and a polycyclic aromatic content of less than 3 wt %, and a fat, the additive having a kinematic viscosity at 40° C. of 40 to 400 mm²/s, a polycyclic aromatic content of less than 3 wt % and a flash point of 220° C. or more (see Patent Document 2), have been proposed. However, the high-viscosity mineral oils used in Patent Documents 1 and 2 are expensive because the oils are generally refined to a high degree, resulting in the prices of the products also become high.

In addition, modified asphalt obtained by adding plastic, rubber, or the like to straight asphalt to improve the properties of the asphalt has been known. For example, Patent Document 3 proposes a modified asphalt formed of asphalt, a waste plastic such as a waste polystyrene, and a waste oil containing an engine oil as a main component. An upper limit for the content of the waste plastic in the modified asphalt disclosed in Patent Document 3 is set to 40 wt %. This is because when the waste plastic is added at a content in excess of 40 wt %, curing starts immediately after the mixing of the materials and hence the resultant product cannot be used as a modified asphalt (see Comparative Example of Patent Document 3). In the industry, however, a modified asphalt blended with an additionally large amount of plastic, rubber, or the like is in demand in expectation of further improvements in the properties of asphalt.

PRIOR ART

Patent Document

[Patent Document 1] Japanese Patent Laid-Open No. 2005-154465
[Patent Document 2] Japanese Patent Laid-Open No. 2005-154464
[Patent Document 3] Japanese Patent Laid-Open No. 2006-143954

Non Patent Document

[Non Patent Document 1] "The Annual Statistical Report of Asphalt Mixtures 2008," Japan Asphalt Mixture Association eds.
[Non Patent Document 2] "Manual for Pavement Recycling," Japan Road Association eds., February 2004, p. 12, p. 207

SUMMARY OF INVENTION

Technical Problem

Therefore, the present invention has been made to solve the above-mentioned problems, and an object of the present invention is to provide an additive for reclaiming asphalt which restores the physical properties of a deteriorated asphalt component to the same extent as that of a conventional additive for reclaiming asphalt, but has low content of components that may affect the environment or humans, has high fluidity at room temperature, and is available at an extremely low cost.

In addition, the present invention has been made to solve the above-mentioned problems, and an object of the present invention is to provide a modified asphalt which can be blended with a large amount of a resin component and which shows improved properties of asphalt.

Solution to Problem

An additive for reclaiming asphalt according to the present invention is obtained by adding straight asphalt to a mixture of a waste animal or vegetable oil and a waste mineral oil having a kinematic viscosity at 60° C. of 10 to 40 mm²/s, mixing the materials, and heating the resultant mixture to remove an aromatic component.

In addition, the present invention is a reclaimed asphalt pavement material obtained by adding the above-mentioned additive for reclaiming asphalt to an asphalt pavement waste or a mixture of a fresh aggregate and an asphalt pavement waste.

In addition, a modified asphalt according to the present invention is obtained by adding, to molten straight asphalt, a xerogel-like amorphous resin, which is obtained by dissolving an amorphous resin with an organic solvent capable of dissolving the amorphous resin to provide a gel- or dough-like amorphous resin in a saturated state, immersing the resin in alcohol to remove the organic solvent, and drying the remainder, together with a waste animal or vegetable oil, and mixing the materials.

In addition, a modified asphalt according to the present invention is obtained by adding, to molten straight asphalt, a product, which is obtained by dissolving an amorphous resin with an organic solvent capable of dissolving the amorphous resin to provide a gel- or dough-like amorphous resin in a saturated state, and heating the resin to melt the resin, together with a waste animal or vegetable oil, and mixing the materials, wherein the content of the gel- or dough-like amorphous resin in the modified asphalt is 70 wt % to 90 wt %.

Further, the present invention is an asphalt pavement material where the above-mentioned modified asphalt is added to a fresh aggregate, an asphalt pavement waste, or a mixture of a fresh aggregate and an asphalt pavement waste.

Advantageous Effects of the Invention

According to the present invention, it is possible to provide an additive for reclaiming asphalt which restores the physical properties of a deteriorated asphalt component to the same extent as that of a conventional additive for reclaiming asphalt, has low content of components that may affect the environment or humans, has high fluidity at room temperature, and is available at an extremely low cost.

Further, according to the present invention, it is possible to provide a modified asphalt which can be blended with a large amount of a resin component and which shows improved properties of asphalt.

DESCRIPTION OF EMBODIMENTS

Figure 1:
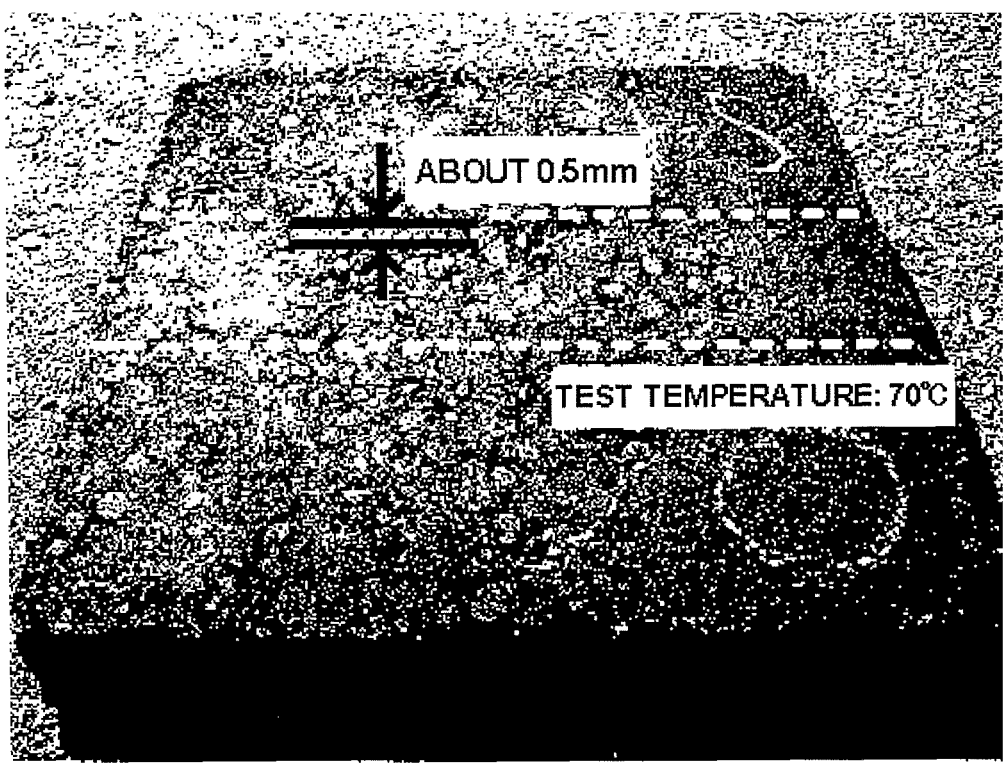
FIG. 1 is a photograph showing a surface state after a wheel tracking test for the reclaimed asphalt pavement material obtained in Example 15.

Hereinafter, the present invention will be described in detail.

First, an additive for reclaiming asphalt of the present invention is described.

In industry, compensating for aromatic components in asphalt lost by its deterioration has heretofore been considered most important in restoring the physical properties of the asphalt, and hence most of the conventional additives for reclaiming asphalt have each contained a large amount of an aromatic component. However, the inventor of the present invention has judged from previous experiences that the aromatic component is not useful in restoring the physical properties of asphalt because most of the component evaporates at the time of heating and mixing. In view of the foregoing, the inventor of the present invention, after conducting intensive studies and development for restoring the physical properties of asphalt through the control of the softening and dispersion of the asphalt, has found that that a product obtained by dissolving straight asphalt in a mixture of a waste animal or vegetable oil and a waste mineral oil, and removing aromatic components from the solution is useful, to complete the present invention.

That is, an additive for reclaiming asphalt of the present invention is obtained by adding straight asphalt to a mixture of a waste animal or vegetable oil and a waste mineral oil having a kinematic viscosity at 60° C. of 10 mm$^2$/s to 40 mm$^2$/s, mixing the materials, and heating the resultant mixture to remove aromatic components. A temperature for the heating may be a temperature at which the aromatic components mainly incorporated into the waste mineral oil and the straight asphalt can be removed, and is preferably 230° C. to 250° C.

A mixing ratio of the waste animal or vegetable oil to the waste mineral oil having a kinematic viscosity at 60° C. of 10 mm$^2$/s to 40 mm$^2$/s is preferably 1:9 to 99.1:0.1, more preferably 1:9 to 9:1, most preferably 5:5 to 9:1 on a weight basis from the viewpoint of balance between the softening of the straight asphalt from the waste mineral oil and the dispersibility of the straight asphalt from the waste animal or vegetable oil. The mixing ratio of the waste animal or vegetable oil is desirably increased to raise the flash point of the additive in order to further improve safety at the time of its production. In addition, the addition amount of the straight asphalt is preferably such an amount that the additive for reclaiming asphalt has a kinematic viscosity at 60° C. of 80 mm$^2$/s to 200 mm$^2$/s, and is typically 3 wt % to 30 wt % with respect to the additive for reclaiming asphalt, though the preferred amount varies depending on the degree of penetration of the straight asphalt. Straight asphalts having a penetration degree of 20 to 80 are preferably used. Of those, straight asphalt having a penetration degree of 20 to 40 is desirable because the kinematic viscosity can be adjusted to a desired level with a small addition amount.

A waste vegetable oil, or waste animal oil discarded from ordinary households, eateries, or the like can be used as the waste animal or vegetable oil in the present invention, and such waste animal or vegetable oil typically has a kinematic viscosity at 60° C. of 60 mm$^2$/s to 150 mm$^2$/s.

The waste mineral oil in the present invention may be any waste mineral oils having a kinematic viscosity at 60° C. of 10 mm$^2$/s to 40 mm$^2$/s, and waste lubricating oil, waste engine oil, or the like discarded from gas stations or the like can be used. In addition, a waste animal or vegetable oil and a waste mineral oil treated in advance with a filtering apparatus such as a strainer in order to remove foreign matter in the waste animal or vegetable oil and the waste mineral oil are preferably used. It should be noted that the kinematic viscosity is a value determined according to JIS K2283.

The additive for reclaiming asphalt of the present invention has an excellent ability to restore the physical properties of a deteriorated asphalt component, has low content of aromatic components that may affect the environment or humans, and has such a high fluidity at room temperature that the additive can be directly used as an additive in a plant mix system without being heated. In addition, the additive is available at an extremely low cost because the additive utilizes waste products. Further, the additive for reclaiming asphalt of the present invention has an advantage that the physical properties of the deteriorated asphalt component can be restored with a smaller addition amount than that of a conventional additive for reclaiming asphalt.

A reclaimed asphalt pavement material of the present invention is obtained by adding the additive for reclaiming asphalt to an asphalt pavement waste or a mixture of a fresh aggregate and the asphalt pavement waste, and melting and mixing the materials under temperatures of 150° C. to 180° C.

In the present invention, the additive for reclaiming asphalt and a modified asphalt that is described later may be used in combination. When the modified asphalt is used in combination, the melting and mixing can be performed under temperatures of 150° C. to 170° C.

Here, examples of the asphalt pavement waste include products (recycled aggregates) obtained by pulverizing asphalt pavement waste generated during various types of construction (such as road pavement construction and underground piping construction). The amount of the deteriorated asphalt in the asphalt pavement waste is typically 2 wt % to 6 wt %. The asphalt pavement waste preferably has a penetration degree of 20 or more in consideration of ease of reclamation. It should be noted that the penetration degree is a value determined according to JIS K2207 (1996) at 25° C.

The addition amount of the additive for reclaiming asphalt with respect to the asphalt pavement waste or the mixture of the fresh aggregate and the asphalt pavement waste is an amount needed to restore the physical properties (such as penetration degree and stability) of the asphalt pavement waste to desired values, and may be appropriately determined within the range of 1 wt % to 6 wt % with respect to the deteriorated asphalt in the asphalt pavement waste or the mixture of the fresh aggregate and the asphalt pavement waste.

Conventionally known aggregates including natural aggregates such as size-5, 6, or 7 single-sized crushed stone, coarse sand, fine sand, and screenings, and artificial aggregates can be used as the fresh aggregate.

Next, a modified asphalt of the present invention will be described.

The modified asphalt of the present invention is obtained by adding, to straight asphalt melted by being heated (typically heated to about 80° C. to 100° C.), a xerogel-like amorphous resin, or a gel- or dough-like amorphous resin melted by being heated together with a waste animal or vegetable oil, and mixing the materials. While the modified asphalt disclosed in Patent Document 3 can be blended with only up to 40 wt % of a resin component, the modified asphalt of the present invention can be blended with up to 90 wt % of the xerogel-like amorphous resin, or the gel- or dough-like amorphous resin as a resin component. The inventor of the present invention has experimentally experienced the fact that a uniform mixture cannot be obtained even when the straight asphalt, the waste animal or vegetable oil, and a large amount of an amorphous resin (such as a polystyrene or a polyvinyl chloride) are stirred and mixed at high temperature for a long time. The inventor of the present invention felt that this may be because the cohesive energy of the amorphous resin is so large that the uniform mixing cannot be performed, and attempted to blend the amorphous resin in a state of reduced cohesive energy. As a result, the inventor surprisingly found that the gel- or dough-like amorphous resin can be blended at 70 wt % to 90 wt % into the modified asphalt and that the xerogel-like amorphous resin can be blended at 1 wt % to 90 wt % into the modified asphalt.

The gel- or dough-like amorphous resin in the present invention is obtained by gradually adding, to a proper organic solvent (such as a thinner, toluene, benzene, acetone, ethyl acetate, cyclohexanone, 2-butanone, white kerosene, or a mixture thereof) capable of dissolving an amorphous resin such as a polystyrene, a polyvinyl chloride, an ABS resin, or an acrylic resin, the amorphous resin at a content in the range of 100 wt % to 250 wt % to dissolve the resin, thereby bringing the resin into a saturated state. In particular, a mixed organic solvent containing ethyl acetate and white kerosene at a volume ratio of 0.5 to 4:9.5 to 6 is preferably used for the dissolution of the polystyrene, a mixed organic solvent containing cyclohexanone and white kerosene at a volume ratio of 0.5 to 4:9.5 to 6 is preferably used for the dissolution of the polyvinyl chloride, and a mixed organic solvent containing 2-butanone and white kerosene at a volume ratio of 0.5 to 4:9.5 to 6 is preferably used for the dissolution of the ABS resin. Such gel- or dough-like amorphous resin is uniformly mixed with the straight asphalt when the waste animal or vegetable oil is used as a dispersant because the resin is in a state of reduced cohesive energy as a result of the occurrence of a molecular shift. It should be noted that a blending amount of the gel- or dough-like amorphous resin of less than 70 wt % is not desirable because curing starts in a relatively short time period. A blending amount of the gel- or dough-like amorphous resin in excess of 90 wt % is also not desirable because the properties of the amorphous resin become so strong that the resin tends to solidify, which results in remarkably poor workability.

In addition, the xerogel-like amorphous resin in the present invention is obtained by immersing the gel- or dough-like amorphous resin in alcohol (such as methyl alcohol, octanol, and a mixture thereof) to remove the organic solvent remaining in the gel- or dough-like amorphous resin, and drying the remainder. Such xerogel-like amorphous resin can be uniformly mixed with the straight asphalt at a blending ratio as wide as 1 wt % to 90 wt % because the resin shows extremely high compatibility with the straight asphalt when the waste animal or vegetable oil is used as a dispersant. It should be noted that there is no need to heat and melt the xerogel-like amorphous resin in advance at the time of mixing.

Straight asphalt having a penetration degree of 20 to 80 is preferably used.

The modified asphalt of the present invention can provide an asphalt pavement material excellent in mechanical properties such as stability because the blending amount of the resin component can be increased. Further, the modified asphalt whose blending amount of the xerogel-like amorphous resin, or the gel- or dough-like amorphous resin is set to 70 wt % to 90 wt % has an advantage that the modified asphalt clings to very little production equipment such as mixers or conveying machines such as dump trucks. Further, when a conventional asphalt pavement material is used, the asphalt pavement material cools during its transport from an asphalt mixture factory to a construction site, with the result that its workability is impaired. However, an asphalt pavement material to which the modified asphalt of the present invention is added barely causes such problems because of its high heat-retaining property.

An asphalt pavement material of the present invention is obtained by adding the modified asphalt to a fresh aggregate, an asphalt pavement waste, or a mixture of a fresh aggregate and asphalt pavement waste, and melting and mixing the materials under temperatures of 155° C. to 170° C. The addition amount of the modified asphalt with respect to the fresh aggregate may be appropriately determined within such a range that the amount of the modified asphalt in the asphalt pavement material to be obtained is 2 wt % to 8 wt %. In addition, the addition amount of the modified asphalt with respect to the asphalt pavement waste or the mixture of the fresh aggregate and the asphalt pavement waste may be appropriately determined within the range of 1 wt % to 45 wt % with respect to the deteriorated asphalt in the asphalt pavement waste or the mixture of the fresh aggregate and the asphalt pavement waste. The asphalt pavement material of the present invention may be further blended with straight asphalt as required. The melt-mixing temperature and compaction temperature of the asphalt pavement material of the present invention can each be lowered by about 20° C. as compared with that of a commercially available dense-graded asphalt mixture. In addition, the melt-mixing temperature and compaction temperature of the asphalt pavement material can each be lowered by about 30° C. as compared with that of a commercially available blown asphalt mixture. Accordingly, energy consumption needed for production of the asphalt pavement material and carbon dioxide emissions can be curtailed.

The same products as those used in the additive for reclaiming asphalt can be used as the fresh aggregate and the asphalt pavement waste in the present invention.

In addition, the asphalt pavement material of the present invention may be further blended with any one of fillers such as silica, talc, calcium hydroxide, calcium carbonate, various minerals, and glass waste in addition to the above-mentioned components. A preferred blending ratio of the filler is 35 wt % to 55 wt % with respect to the entirety of the asphalt pavement material. Since the modified asphalt of the present invention is blended with the amorphous resin, its bonding force with the aggregate or the filler such as glass waste is increased and hence the scattering of the aggregate, the glass waste, or the like toward a paved surface can be suppressed.

The additive for reclaiming asphalt of the present invention may be in a solid and in which the additive for reclaiming asphalt is taken in the xerogel-like amorphous resin obtained as described above. The solid additive for reclaiming asphalt is obtained by heating the additive for reclaiming asphalt to 120° C. to 210° C., adding the amorphous resin to the heated additive, mixing the materials, pouring the mixture into a mold having a predetermined shape and then cooling and solidifying the mixture. A preferred addition amount of the xerogel-like amorphous resin is 40 wt % to 90 wt % with respect to the solid additive for reclaiming asphalt. When the addition amount of the xerogel-like amorphous resin is less than 40 wt %, it is difficult to solidify the mixture. In addition, when the addition amount exceeds 90 wt %, it is difficult to sufficiently restore the physical properties of a deteriorated asphalt component.

EXAMPLES

Hereinafter, the present invention is described in more detail by way of Examples and Comparative Examples, but is not limited by the examples. It should be noted that a penetration degree is a value determined according to JIS K2207 (1996) at 25° C.

Example 1A

A waste animal or vegetable oil (obtained from a waste disposal dealer, kinematic viscosity at 60° C.: 60 mm$^2$/s) and a waste mineral oil (obtained from a gas station, kinematic viscosity at 60° C.: 30 mm$^2$/s) were mixed at a ratio of 1:1 on a weight basis. It should be noted that foreign matter was removed by passing the waste animal or vegetable oil and the waste mineral oil through a 250-mesh woven metal strainer and a 440-mesh woven metal strainer before their use. After 9.1 parts by weight of straight asphalt (having a penetration degree of 20 to 40) was added to 90.9 parts by weight of the mixture, the resultant liquid was heated to 230° C. while the entirety of the liquid was stirred. The liquid was held at 230° C. for 10 minutes and then left standing to cool. Thus, an additive for reclaiming asphalt of Example 1A was obtained. Table 1 shows various physical properties of the resultant additive for reclaiming asphalt. Table 1 also shows various physical properties of commercially available additives for reclaiming asphalt (FRESHSOL 200 manufactured by SHOWA SHELL SEKIYU K.K. and T-REVIVE manufactured by Takenaka Sangyo Co., Ltd.).

TABLE 1

|  | Quality[*1] | Example 1A | FRESHSOL 200 | T-REVIVE |
|---|---|---|---|---|
| Kinematic viscosity at 40° C. (mm$^2$/s) |  | 175 |  | 150.5 |
| Kinematic viscosity at 60° C. (mm$^2$/s) | 80 to 1000 | 80.8 | 526 | 53.39 |
| Flash point (° C.) | 230 or more | 240 | 327 | 252 |
| Density at 15° C. (g/cm$^3$) |  | 0.894 | 0.978 | 0.911 |
| Pour point (° C.) | 2 or less | −27.5 |  | −17.5 |
| Viscosity ratio at 60° C. after heating of thin film |  | 1.05 | 1.1 | 1.08 |
| Mass change ratio after heating of thin film (%) | Within ±3 | −1.17 | −0.07 | −0.82 |
| Aromatic content[*2] (wt %) |  | 3.4 | 83.5 | 15.6 |

[*1]According to "Pavement Recycling Handbook" (February 2004)
[*2]The aromatic content was measured by a TLC-FID method using an IATROSCAN.

As can be seen from the results of Table 1, the additive for reclaiming asphalt of Example 1A satisfies all aspects of quality as an additive for reclaiming asphalt according to a plant recycling pavement technology guideline. In particular, since the additive has so low a pour point, there is no need to heat the additive at the time of its transport or storage. Further, it can be said that the additive for reclaiming asphalt of Example 1A is friendly to the environment and humans because its aromatic content is extremely small as compared with that of commercially available products. In addition, the additive for reclaiming asphalt of Example 1A can be available at a low cost because 90 wt % or more of the additive is formed of waste.

Next, 100 parts by weight of deteriorated asphalt (asphalt extracted from an asphalt pavement waste, penetration degree: 27) were heated to about 180° C. 5.6 Parts by weight of the additive for reclaiming asphalt of Example 1A were added to the deteriorated asphalt and then the materials were mixed at about 165° C. After that, the mixture was compacted at 147° C. to 152° C. Thus, a reclaimed asphalt test piece was obtained. Table 2 shows various physical properties of the resultant reclaimed asphalt test piece.

TABLE 2

|  | Quality[*1] | Example 1A |
|---|---|---|
| Penetration degree (1/10 mm) | More than 60 and 80 or less | 73 |
| Softening point (° C.) | 44.0 to 52.0 | 45 |
| Ductility at 15° C. (cm) | 100 or more | 113 |
| Toluene soluble matter (%) | 99.0 or more | 99.9 |
| Flash point (° C.) | 260 or more | 317 |
| Mass change ratio after heating of thin film (%) | 0.6 or less | −0.2 |
| Penetration degree residual ratio after heating of thin film (%) | 55 or more | 78.1 |
| Penetration degree ratio after evaporation | 110 or less | 94.4 |
| Density at 15° C. (g/cm$^3$) | 1.000 or more | 1.034 |
| Kinematic viscosity at 120° C. (mm$^2$/s) |  | 1130.4 |
| Kinematic viscosity at 150° C. (mm$^2$/s) |  | 285.1 |
| Kinematic viscosity at 180° C. (mm$^2$/s) |  | 92.5 |

[*1]According to "Pavement Recycling Handbook" (February 2004)

As can be seen from the results of Table 2, the asphalt reclaimed with the additive for reclaiming asphalt of Example 1A satisfies all aspects of quality as reclaimed asphalt. Accordingly, the additive for reclaiming asphalt of Example 1A can sufficiently restore the physical properties of a deteriorated asphalt component. Further, the asphalt reclaimed with the additive for reclaiming asphalt of Example 1A has a kinematic viscosity at 150° C. of 285 mm$^2$/s, which means that its fluidity is high (when a conventional additive for reclaiming asphalt is used, the kinematic viscosity at 150° C. is 350 mm$^2$/s or more). It is assumed from the foregoing that uniform mixing can be performed at a lower temperature than a conventional one. In addition, in order that the kinematic viscosity of the reclaimed asphalt at 150° C. may be adjusted with the conventional additive for reclaiming asphalt to the same level as that of Example 1A, the conventional additive needs to be added in an amount about two to three times as large as that of Example 1A. A high kinematic viscosity of the reclaimed asphalt is not desirable because the high kinematic viscosity leads to a reduction in strength of a reclaimed asphalt pavement material.

Example 1B

A waste animal or vegetable oil (obtained from a waste disposal dealer, kinematic viscosity at 60° C.: 60 mm$^2$/s) and a waste mineral oil (obtained from a gas station, kinematic viscosity at 60° C.: 30 mm$^2$/s) were mixed at a ratio of 9:1 on a weight basis. It should be noted that foreign matter was removed by passing the waste animal or vegetable oil and the waste mineral oil through a 250-mesh woven metal strainer and a 440-mesh woven metal strainer before their use. After 9.1 parts by weight of straight asphalt (having a penetration degree of 20 to 40) was added to 90.9 parts by weight of the mixture, the resultant liquid was heated to 230° C. while the entirety of the liquid was stirred. The liquid was held at 230° C. for 10 minutes and then left standing to cool. Thus, an additive for reclaiming asphalt of Example 1B was obtained. The resultant additive for reclaiming asphalt had a density at 15° C. of 0.931 g/cm$^3$ and a flash point of 318° C.

The additive for reclaiming asphalt of Example 1B obtained in the foregoing was added at 10 wt % with respect to the deteriorated asphalt in an asphalt pavement waste (having a penetration degree of 24), and then the materials were melted and mixed at about 180° C. Thus, a reclaimed asphalt pavement material (having a penetration degree of about 70) was obtained.

A specimen was produced by compacting the resultant reclaimed asphalt pavement material at 165° C., and was then subjected to a wheel tracking test (vertical load: 70 kg, 60° C. contact pressure: 6.4 kgf/cm$^2$, test temperature: 60° C., number of times of run: 2,520, running method: chain type). As a result, the specimen had a dynamic stability (DS) of 5,053 times/mm (average of three measured values) and a consolidation deformation amount of about 1.48 mm (average of three measured values).

Comparative Example 1

A commercially available additive for reclaiming asphalt (FRESHSOL 200 manufactured by SHOWA SHELL SEKIYU K.K.) was added at 18 wt % with respect to the deteriorated asphalt in an asphalt pavement waste (having a penetration degree of 24), and then the materials were melted and mixed at about 180° C. Thus, a reclaimed asphalt pavement material (having a penetration degree of about 70) was obtained.

A specimen was produced by compacting the resultant reclaimed asphalt pavement material at 165° C., and was then subjected to a wheel tracking test (vertical load: 70 kg, 60° C. contact pressure: 6.4 kgf/cm$^2$, test temperature: 60° C., number of times of run: 2,520, running method: chain type). As a result, the specimen had a dynamic stability (DS) of 3,088 times/mm (average of three measured values) and a consolidation deformation amount of about 1.71 mm (average of three measured values).

As can be seen from the results of the wheel tracking tests of Example 1B and Comparative Example 1, it can be said that the reclaimed asphalt pavement material using the additive for reclaiming asphalt of Example 1B has strength and heat resistance much higher than those of the reclaimed asphalt pavement material using the commercially available additive for reclaiming asphalt.

Example 2

A mixture containing 60 wt % of an asphalt pavement waste (having a penetration degree of 27) and 40 wt % of a fresh aggregate was heated to about 170° C. 5.6 wt % of the same additive for reclaiming asphalt as that used in Example 1A with respect to the deteriorated asphalt in the mixture and a predetermined amount (such an amount that the total asphalt amount was 5.0 wt %, 5.5 wt %, 6.0 wt %, 6.5 wt %, or 7.0 wt %) of fresh asphalt (having a penetration degree of 60 to 80) were added to the mixture, and then the materials were mixed at about 170° C. Thus, a reclaimed asphalt pavement material was obtained.

Table 3 shows the results of the measurement of the density, stability, flow value, percentage of voids, and degree of saturation of the resultant reclaimed asphalt pavement material. It should be noted that the density, the stability, the flow value, the percentage of voids, and the degree of saturation are values determined by a Marshall test method.

TABLE 3

| | Total asphalt amount (wt %) | Density (g/cm³) | Stability (kN) | Flow value (1/100 cm) | Percentage of voids (%) | Degree of saturation (%) |
|---|---|---|---|---|---|---|
| Example 2 | 5.0 | 2.323 | 13.55 | 30 | 5.3 | 67.9 |
| | 5.5 | 2.327 | 12.69 | 29 | 4.4 | 73.6 |
| | 6.0 | 2.352 | 12.59 | 35 | 2.7 | 83.7 |
| | 6.5 | 2.357 | 13.45 | 38 | 1.8 | 89.3 |
| | 7.0 | 2.354 | 12.39 | 41 | 0.9 | 94.5 |

As can be seen from the results of Table 3, the additive for reclaiming asphalt of the present invention can produce a reclaimed asphalt pavement material whose stability and flow value are good even when its addition amount is as small as 5.6 wt % with respect to the deteriorated asphalt in a mixture of an asphalt pavement waste and a fresh aggregate. When an attempt was made to obtain a reclaimed asphalt pavement material having the same levels of stability and flow value with a conventional additive for reclaiming asphalt, the conventional additive needed to be added at 10 wt % to 14 wt %.

Example 3

1.5 Parts by weight of an expanded polystyrene were gradually added to 1 part by weight of a mixed organic solvent containing ethyl acetate and white kerosene at a volume ratio of 2:8. Thus, the expanded polystyrene was dissolved. Then, the materials were mixed to provide a gel-like polystyrene. Next, the resultant gel-like polystyrene was immersed in a mixed alcohol containing methyl alcohol and octanol at a volume ratio of 8:2 for about 3 hours. After that, the polystyrene was taken out and dried at room temperature. Thus, a xerogel-like polystyrene was obtained.

60 Parts by weight of the xerogel-like polystyrene and 1.5 parts by weight of a waste animal or vegetable oil (obtained from a waste disposal dealer, kinematic viscosity at 60° C.: 60 mm²/s) were added to 240 parts by weight of straight asphalt (having a penetration degree of 60 to 80) melted by being heated to about 100° C., and then the materials were mixed. Thus, a modified asphalt of Example 3 was obtained. The resultant modified asphalt was a uniform mixture.

Example 4

A modified asphalt was obtained in the same manner as in Example 3 except that the amounts of the straight asphalt and the xerogel-like polystyrene were changed to 180 parts by weight and 120 parts by weight, respectively. The resultant modified asphalt was a substantially uniform mixture, though the modified asphalt contained a small amount of the solidified product of the polystyrene.

Example 5

A modified asphalt was obtained in the same manner as in Example 3 except that the amounts of the straight asphalt and the xerogel-like polystyrene were changed to 120 parts by weight and 180 parts by weight, respectively. The resultant modified asphalt was a substantially uniform mixture, though the modified asphalt contained a small amount of the solidified product of the polystyrene.

Example 6

A modified asphalt was obtained in the same manner as in Example 3 except that the amount of the waste animal or vegetable oil was changed to 9 parts by weight. The resultant modified asphalt was a uniform mixture.

Example 7

A modified asphalt was obtained in the same manner as in Example 3 except that the amounts of the straight asphalt, the xerogel-like polystyrene, and the waste animal or vegetable oil were changed to 180 parts by weight, 120 parts by weight, and 9 parts by weight, respectively. The resultant modified asphalt was a uniform mixture.

Example 8

A modified asphalt was obtained in the same manner as in Example 3 except that the amounts of the straight asphalt, the xerogel-like polystyrene, and the waste animal or vegetable oil were changed to 120 parts by weight, 180 parts by weight, and 9 parts by weight, respectively. The resultant modified asphalt was a substantially uniform mixture, though the modified asphalt contained a small amount of the solidified product of the polystyrene.

Example 9

A modified asphalt was obtained in the same manner as in Example 3 except that the amount of the waste animal or vegetable oil was changed to 27 parts by weight. The resultant modified asphalt was a uniform mixture.

Example 10

A modified asphalt was obtained in the same manner as in Example 3 except that the amounts of the straight asphalt, the xerogel-like polystyrene, and the waste animal or vegetable oil were changed to 180 parts by weight, 120 parts by weight, and 27 parts by weight, respectively. The resultant modified asphalt was a uniform mixture.

Example 11

A modified asphalt was obtained in the same manner as in Example 3 except that the amounts of the straight asphalt, the xerogel-like polystyrene, and the waste animal or vegetable oil were changed to 120 parts by weight, 180 parts by weight, and 27 parts by weight, respectively. The resultant modified asphalt was a uniform mixture.

Comparative Example 2

The same operations as those of Example 3 were performed except that the waste animal or vegetable oil was not added. As a result, the added xerogel-like polystyrene solidified and hence a uniform mixture could not be obtained.

Comparative Example 3

The same operations as those of Example 3 were performed except that 1.5 parts by weight of a REDICOTE E-11

(asphalt emulsifier) manufactured by Lion Corporation were added instead of 1.5 parts by weight of the waste animal or vegetable oil. As a result, the added xerogel-like polystyrene solidified and hence a uniform mixture could not be obtained.

Comparative Example 4

The same operations as those of Example 3 were performed except that 1.5 parts by weight of DUOMEEN T (asphalt emulsifier) manufactured by Lion Corporation were added instead of 1.5 parts by weight of the waste animal or vegetable oil. As a result, the added xerogel-like polystyrene solidified and hence a uniform mixture could not be obtained.

Comparative Example 5

A modified asphalt was obtained in the same manner as in Example 3 except that 1.5 parts by weight of Newcol 1203 (nonionic surfactant) manufactured by Nippon Nyukazai Co., Ltd. were added instead of 1.5 parts by weight of the waste animal or vegetable oil. The resultant modified asphalt was a substantially uniform mixture, though the modified asphalt contained a small amount of the solidified product of the polystyrene.

As can be seen from the results of Comparative Examples 3 and 4, the xerogel-like polystyrene could not be dispersed in the straight asphalt with a commercially available asphalt emulsifier. Further, as can be seen from the results of Examples 3 to 11, and Comparative Example 2 and Comparative Example 5, the waste animal or vegetable oil is assumed to serve to disperse the xerogel-like polystyrene in the straight asphalt. Although Newcol 1203 manufactured by Nippon Nyukazai Co., Ltd. can disperse the xerogel-like polystyrene in the straight asphalt, Newcol 1203 is more expensive than the waste animal or vegetable oil and hence cannot be put into practical use. In addition, even when the types of amorphous resin was changed to an ABS resin or a polyvinyl chloride, the same tendency as that of the polystyrene was observed.

Example 12

1.5 Parts by weight of an expanded polystyrene were gradually added to 1 part by weight of a mixed organic solvent containing ethyl acetate and white kerosene at a volume ratio of 2:8, thus dissolving the expanded polystyrene. Then, the materials were mixed to provide a gel-like polystyrene.

750 Parts by weight of the gel-like polystyrene and 30 parts by weight of a waste animal or vegetable oil (obtained from a waste disposal dealer, kinematic viscosity at 60° C.: 60 mm$^2$/s) were added to 250 parts by weight of straight asphalt (having a penetration degree of 60 to 80) melted by being heated to about 100° C., and then the materials were mixed. Thus, the modified asphalt of Example 12 was obtained. The resultant modified asphalt was a uniform mixture.

Example 13

A modified asphalt was obtained in the same manner as in Example 12 except that the amounts of the straight asphalt and the gel-like polystyrene were changed to 200 parts by weight and 800 parts by weight, respectively. The resultant modified asphalt was a uniform mixture.

Example 14

A modified asphalt was obtained in the same manner as in Example 12 except that the amounts of the straight asphalt and the gel-like polystyrene were changed to 100 parts by weight and 900 parts by weight, respectively. The resultant modified asphalt was a uniform mixture.

Comparative Example 6

The same operations as those of Example 12 were performed except that the waste animal or vegetable oil was not added. As a result, the added gel-like polystyrene solidified and hence a uniform mixture could not be obtained.

Comparative Example 7

The same operations as those of Example 12 were performed except that the amounts of the straight asphalt and the gel-like polystyrene were changed to 500 parts by weight and 500 parts by weight, respectively. As a result, the added gel-like polystyrene solidified and hence a uniform mixture could not be obtained.

As can be seen from the results of Examples 12 to 14 and Comparative Example 6, the addition of 70 wt % or more of the gel-like polystyrene enabled uniform dispersion of the gel-like polystyrene in the straight asphalt. Further, the adhesion of a large amount of the straight asphalt to a mixer was observed in Comparative Example 6 while the straight asphalt in each of the modified asphalts of Examples 12 to 14 did not cling to a mixer. On the other hand, as can be seen from the result of Comparative Example 7, when the addition amount of the gel-like polystyrene was less than 70 wt %, the gel-like polystyrene could not be dispersed in the straight asphalt. This is assumed to be because the mixed organic solvent in the gel-like polystyrene exerts a certain influence.

Example 15

The modified asphalt obtained in Example 13 was added at 2 wt % with respect to the deteriorated asphalt in an asphalt pavement waste (having a penetration degree of 27), and then the materials were melted and mixed at about 160° C., thus to obtain a reclaimed asphalt pavement material.

A specimen was produced by compacting the resultant reclaimed asphalt pavement material at 150° C., and this was then subjected to a wheel tracking test (vertical load: 70 kg, 60° C. contact pressure: 6.4 kgf/cm$^2$, test temperature: 70° C., number of times of run: 2,520, running method: chain type). As a result, the specimen had a dynamic stability (DS) of 15,750 times/mm and a rut depth of about 0.5 mm. FIG. 1 shows the surface state of the reclaimed asphalt pavement material after the wheel tracking test.

Comparative Example 8

Figure 2:
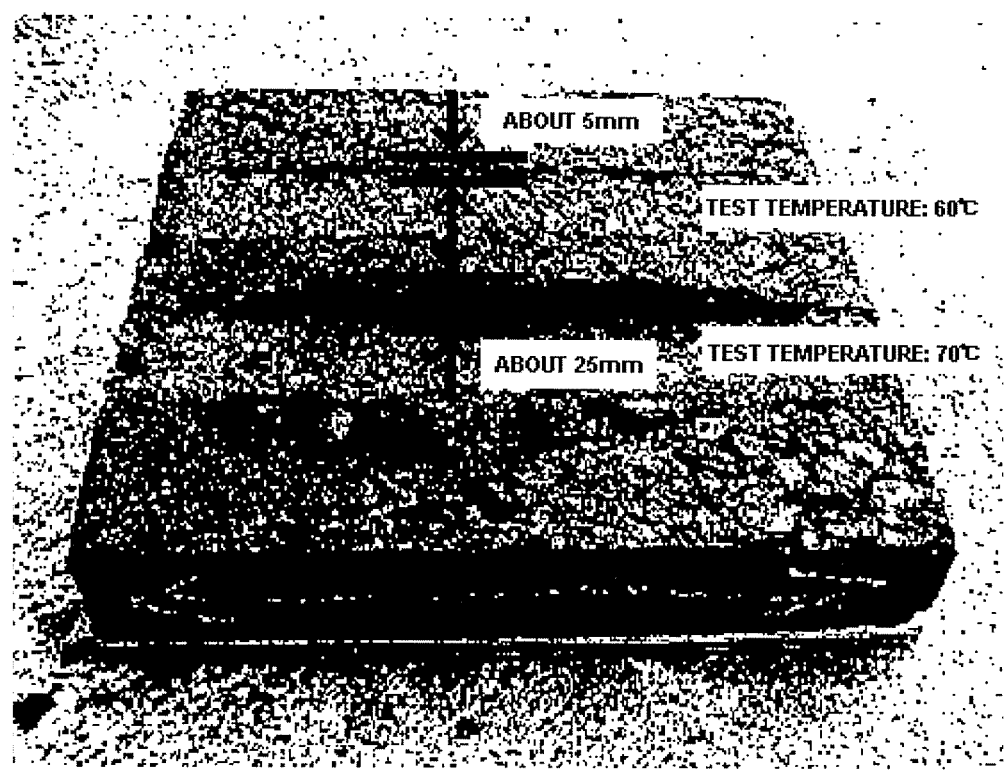
FIG. 2 is a photograph showing a surface state after a wheel tracking test for the asphalt pavement material obtained in Comparative Example 8.

A specimen was produced from a commercially available dense-graded asphalt mixture (modified type II) and then subjected to the wheel tracking test under the same conditions. As a result, the specimen had a dynamic stability (DS) of 880 times/mm and a rut depth of about 25 mm. In addition, the wheel tracking test was performed while the test temperature was changed to 60° C. As a result, the specimen had a dynamic stability (DS) of 4,366 times/mm and a rut depth of about 5 mm. FIG. 2 shows the surface state of the asphalt pavement material after the wheel tracking test.

Comparative Example 9

Figure 3:
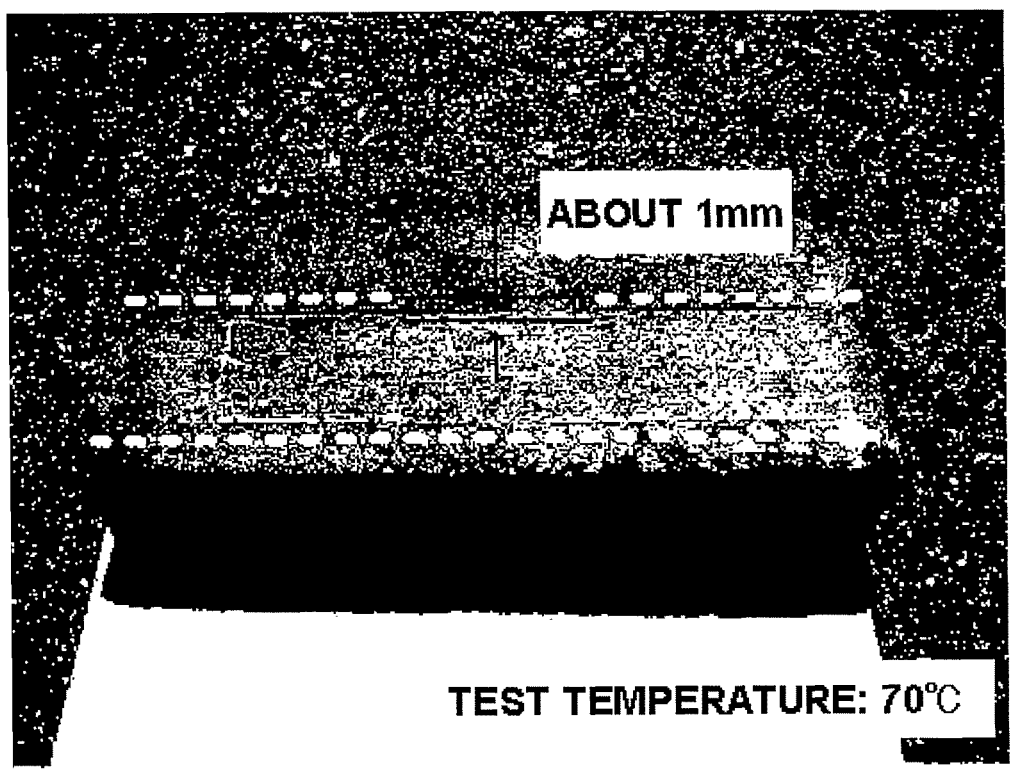
FIG. 3 is a photograph showing a surface state after a wheel tracking test for the asphalt pavement material obtained in Comparative Example 9.

A specimen was produced from a commercially available blown asphalt mixture and then subjected to the wheel tracking test under the same conditions. As a result, the specimen had a dynamic stability (DS) of 8,289 times/mm and a rut depth of about 1 mm. FIG. 3 shows the surface state of the asphalt pavement material after the wheel tracking test.

As can be seen from the results of Comparative Example 8, an asphalt pavement material obtained from a dense-graded asphalt mixture that is now on the market had a dynamic stability (DS) of 4,366 times/mm at a test temperature of 60° C. but the dynamic stability was reduced by a factor of about 5 at a test temperature of 70° C. It can be said from the foregoing that ruts will immediately appear in the asphalt pavement material as global warming progresses in the future, and road surface temperatures exceed 60° C. In contrast, it can be said that there is no fear of ruts appearing in the reclaimed asphalt pavement material of Example 15 because the material has much higher heat resistance than that of the asphalt pavement material (Comparative Example 9) obtained from the blown asphalt mixture that has heretofore been considered as having high heat resistance. In other words, it can be said that a reclaimed asphalt pavement material obtained by adding the modified asphalt of the present invention to an asphalt pavement waste is an extremely useful alternative to the asphalt pavement material obtained from a blown asphalt mixture. In addition, the melt-mixing temperature and compaction temperature of a blown asphalt mixture needed to be set to about 190° C. and about 180° C., respectively, but the production of the pavement material in Example 15 was attained at temperatures about 30° C. lower than those temperatures. Further, the reclaimed asphalt pavement material of Example 15 was found to have high heat-retaining properties because the time period during which the material could be compacted after the melting and mixing was 2 hours or more.

Figure 4:
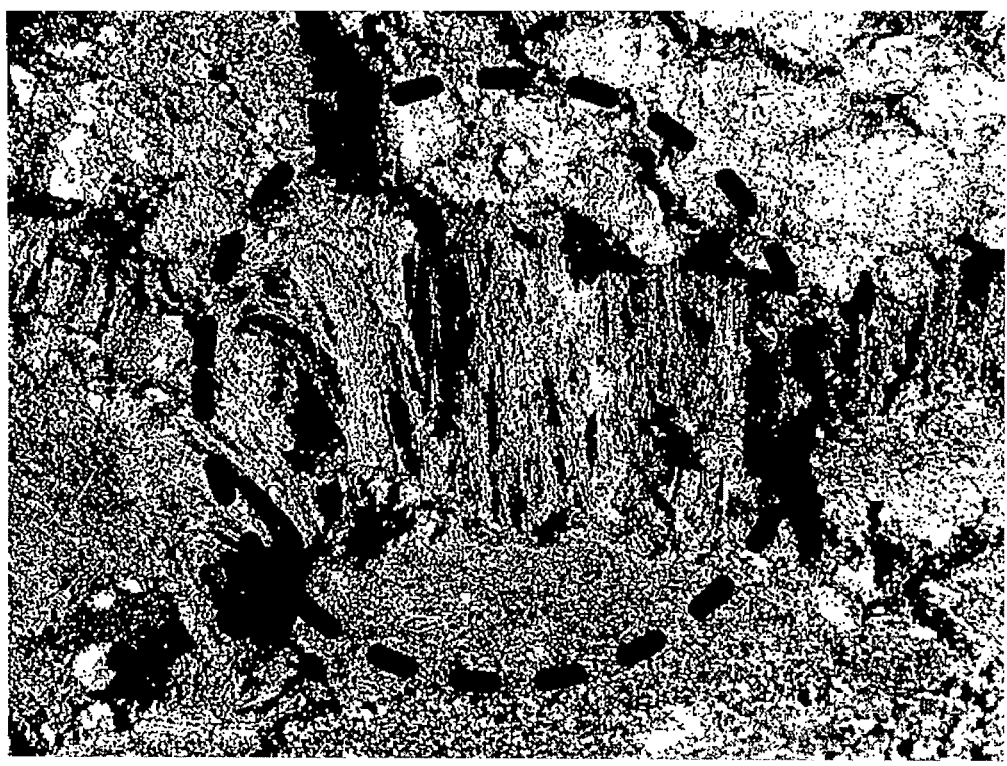
FIG. 4 is a photograph showing a fracture cross-section of the reclaimed asphalt pavement material obtained in Example 15.

Next, in order to investigate the mechanism via which the heat resistance of the reclaimed asphalt pavement material obtained in Example 15 improved, a specimen similar to that produced in Example 15 was produced and then heated to 70° C. to 80° C. After that, the specimen was bent and its fracture cross-section was then observed. FIG. 4 is a photograph of the fracture cross-section. As can be seen from FIG. 4, a state where a thin thread-like resin was intertwined with the entirety of the aggregate was observed.

The invention claimed is:

1. A method of producing an additive for reclaiming asphalt, comprising:
    adding straight asphalt to a mixture of (a) waste animal and/or vegetable oil and (b) a waste mineral oil having a kinematic viscosity at 60° C. of 10 mm²/s to 40 mm²/s,
    mixing the materials,
    heating the resultant mixture thereby removing an aromatic component, and
    obtaining the additive for reclaiming asphalt.

2. The method of producing an additive for reclaiming asphalt according to claim 1, wherein the mixing ratio of the waste animal and/or vegetable oil to the waste mineral oil having a kinematic viscosity at 60° C. of 10 mm²/s to 40 mm²/s is 1:9 to 99.1:0.1.

3. The method of producing an additive for reclaiming asphalt according to claim 1, wherein the straight asphalt has a penetration degree of 20 to 80 according to JIS K2207 at 25° C.

4. The method of producing an additive for reclaiming asphalt according to claim 1, wherein the amount of the straight asphalt is 3 wt % to 30 wt % with respect to the additive for reclaiming asphalt.

5. A method of reclaiming reclaimed asphalt pavement material, comprising
    adding the additive for reclaiming asphalt according to claim 1 to an asphalt pavement waste or a mixture of a fresh aggregate and an asphalt pavement waste.

6. The method of reclaiming asphalt pavement material according to claim 5, further comprising melting and mixing the materials under temperatures of 150° C. to 180° C.

7. The method of reclaiming asphalt pavement material according to claim 5, wherein the amount of the additive for reclaiming asphalt is within the range of 1 wt % to 6 wt % with respect to deteriorated asphalt in the asphalt pavement waste or the mixture of the fresh aggregate and the asphalt pavement waste.

8. A method of producing a modified asphalt, comprising adding a xerogel-like consistency amorphous resin to molten straight asphalt together with a waste animal or vegetable oil and mixing the materials,
    wherein the xerogel-like consistency amorphous resin is obtained by
        dissolving an amorphous resin with an organic solvent capable of dissolving the amorphous resin to provide a gel- or dough-like consistency amorphous resin in a saturated state,
        immersing the resin in alcohol to remove the organic solvent, and
        drying the remainder.

9. A method of producing a modified asphalt, comprising adding a product to molten straight asphalt together with a waste animal or vegetable oil and mixing the materials,
    wherein the product is obtained by
        dissolving an amorphous resin with an organic solvent capable of dissolving the amorphous resin to provide a gel- or dough-like consistency amorphous resin in a saturated state, and
        heating the resin to melt the resin, and
    wherein a content of the gel- or dough-like consistency amorphous resin in the modified asphalt is 70 wt % to 90 wt %.

* * * * *